United States Patent [19]

Pahl et al.

[11] Patent Number: 5,326,053
[45] Date of Patent: Jul. 5, 1994

[54] CONTROLLED FLOW AERIAL DELIVERY SYSTEM

[76] Inventors: Larry T. Pahl, 2240 Brewster Place, Abbotsford, B.C., Canada, V2S 5P9; Gregory N. Thorne, 30850 Burgess Av., RR 1, Mt. Lehman, B.C., Canada, V0X 1V0

[21] Appl. No.: 40,315

[22] Filed: Mar. 30, 1993

[30] Foreign Application Priority Data

Jun. 5, 1992 [CA] Canada ............................ 2070546

[51] Int. Cl.⁵ .............................................. B64D 1/16
[52] U.S. Cl. ................................. 244/136; 169/53; 239/171
[58] Field of Search .................... 244/136; 169/53; 239/171

[56] References Cited

U.S. PATENT DOCUMENTS

| | | | |
|---|---|---|---|
| 2,426,771 | 9/1947 | Harp | 244/136 |
| 2,665,092 | 1/1954 | Sands | 244/136 |
| 2,924,040 | 2/1960 | White et al. | 244/136 |
| 3,423,053 | 1/1969 | Hawkshaw | 244/136 |
| 3,442,334 | 5/1969 | Gousetis | 244/136 |
| 3,494,423 | 2/1970 | Stansbury et al. | 169/43 |
| 3,710,868 | 1/1973 | Chadwick | 239/171 |
| 3,754,601 | 8/1973 | Linkewich | 239/171 |
| 3,901,467 | 8/1975 | Hawkshaw | 244/136 |
| 4,172,499 | 10/1979 | Richardson et al. | 244/136 |
| 4,175,701 | 11/1979 | Wojciehowski et al. | 239/11 |
| 4,195,693 | 4/1980 | Busch et al. | 169/53 |
| 4,441,673 | 4/1984 | Muscatell | 244/136 |
| 4,671,472 | 6/1987 | Hawkshaw | 244/136 |

Primary Examiner—David A. Bucci
Assistant Examiner—Anne E. Bidwell
Attorney, Agent, or Firm—Townsend and Townsend Khourie and Crew

[57] ABSTRACT

A tank system for an aerial liquid delivery comprises a liquid tank having an aperture for discharging liquid and a door for the aperture. The door has a seal and a door operating mechanism to remotely open the door a predetermined amount. There is an air pressure reservoir separate from the liquid tank connected to the liquid tank, and source of compressed air to pressurize the air pressure reservoir and liquid tank. The method of liquid delivery from the aircraft involves providing air pressure to a liquid tank, the tank having a door in an aperture for discharging liquid. The pressure provided to the tank before and during liquid discharge from the tank controls the flow of liquid discharging through the aperture.

19 Claims, 2 Drawing Sheets

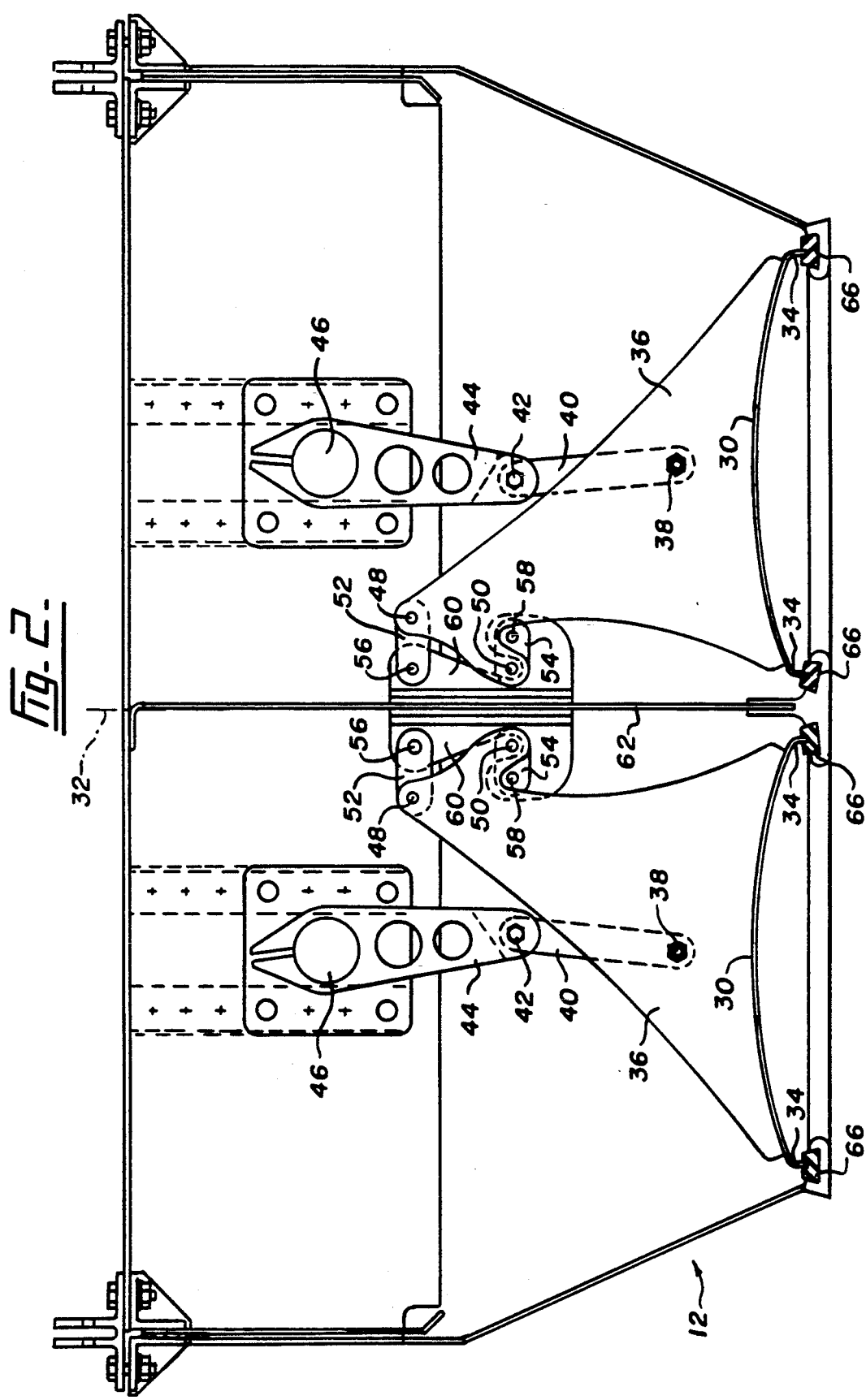

CONTROLLED FLOW AERIAL DELIVERY SYSTEM

TECHNICAL FIELD

The present invention relates to an aerial delivery system for controlling the flow of liquid from a tank inside an aircraft. More specifically, the present invention relates to a tank arrangement for an aerial liquid delivery system and an opening door arrangement for the tank arrangement.

BACKGROUND ART

Liquid delivery systems are used in aircraft primarily for fire fighting. Some types of delivery systems incorporate spray nozzles and these may also be used for crop spraying and the like. But for most fire fighting applications it is necessary to deliver a large quantity of liquid in a short time and this requires opening doors. It is necessary to ensure that liquid from a tank in an aircraft, either fixed wing or other, drops the liquid in a predetermined ground pattern to ensure the best possible coverage to extinguish the fire. Different drop patterns are desirable for different types of fires, for example, in forest fires a high concentration of liquid per area is required, whereas in brush fires and the like a more spread out drop pattern is desirable.

In fixed wing aircraft liquid tanks can contain up to 2500 gallons or more and because these aircraft are moving at a reasonably high air speed, it is necessary to ensure that the drop or discharge occurs over a short time interval to ensure that the liquid is concentrated in the drop pattern. This requires large opening doors otherwise the liquid is spread over a large area and thus does not have the same extinguishing abilities. In one embodiment there is a requirement for approximately one-half gallon per hundred square feet of liquid for grass fires whereas this increases to about four gallons per hundred square feet for forest fires. Most systems do not provide a variable flow rate. In one embodiment this is done by having a large number of doors and varying the door openings.

The door mechanisms for tanks used for aerial liquid delivery generally open outward. While this may provide a fast discharge of the liquid from within the tank it does not lend itself to controlling liquid flow. The doors open and all the liquid from the tank is immediately discharged. It is not easy to close the doors while there is still liquid in the tank as the doors have to close against the liquid discharging from the tank which requires a high force. Furthermore, with outward opening doors it is difficult to provide a suitable seal and in some cases the liquid in the tank tends to leak from the doors even while an aircraft is in flight.

Another problem with outward opening doors, and this particularly occurs with helicopters, is that the doors when open extend down below the landing wheels or skids and thus in certain situations prevent the aircraft landing with the doors open. This can present a problem if the doors become stuck in the open position. Alternatively, one must raise the tank up to ensure that this interference does not prevent the aircraft landing with the doors in the open position, and this may restrict the size of tank that can be carried by the aircraft.

DISCLOSURE OF INVENTION

It is an aim of the present invention to provide a tank system for aerial liquid delivery wherein the tank is pressurized and has doors that open to discharge liquid from the tank. The discharge rate is controlled by the pressure within the tank. It is a further aim of the present invention to provide a tank system for an aerial liquid delivery which has doors that open inward and may be closed or partially closed during discharge to provide better control for discharging the liquid. The doors may also be closed when only a portion of the liquid has discharged. Furthermore, inward opening doors provide a good sealing feature as the pressure inside the tank acts to seal the tank so leakage is minimized. Inward opening doors also provide improved ground clearance for an aircraft, either a fixed wing aircraft or a helicopter. Furthermore, by having inward opening doors one is able to control how far the doors are opened which limits the flow.

By combining the inward opening doors with the pressurized delivery system, one is able to provide exact control of the liquid discharge from the tanks either increasing or decreasing flow rate and also provide a tank wherein several intermittent discharges may be made as desired.

The present invention provides a tank system for aerial liquid delivery comprising a liquid tank having an aperture for discharging liquid, a door for the aperture having sealing means and door operating mechanism to remotely open the door a predetermined amount, air pressure reservoir separate from the liquid tank having connection to the liquid tank, and means to pressurize the air pressure tank.

In a further embodiment there is provided a tank system for an aerial liquid delivery system, having an improved opening door arrangement, comprising a liquid tank having an exterior fixed frame extending around an aperture; an inward opening door in the aperture having a lip extending around the perimeter of the door, a door seal of resilient material extending in the exterior fixed frame extending around the aperture for engagement by the lip of the door; opening mechanism for the door having first movement to move the door directly away from a sealed position to instantly disengage the lip of the door from the door seal, and having a second movement to move the door further away from the door seal to provide a passage on each side of the door for two liquid discharge streams, one on each side of the door, discharging from the aperture.

In yet a further embodiment there is provided a method of liquid delivery from an aircraft comprising the steps of providing air pressure to a liquid tank, the tank having a door in an aperture for discharging liquid, the pressure provided to the tank before and during liquid discharge from the tank to control the flow of liquid discharging through the aperture.

BRIEF DESCRIPTION OF DRAWINGS

In drawings which illustrate embodiments of the present invention,

FIG. 2 is an elevational view showing a door mechanism according to one embodiment of the present invention.

MODES FOR CARRYING OUT THE INVENTION

The type of liquid used for controlling fires includes water and fire retardant liquid agents that are known in the field. When water is used, some types of amphibious aircraft are able to scoop water from a lake or river and thus fill the tanks without having to come to rest. In the case of helicopters, some tanks are supported from beneath the helicopter by cables, others are attached to the frame.

Figure 1:
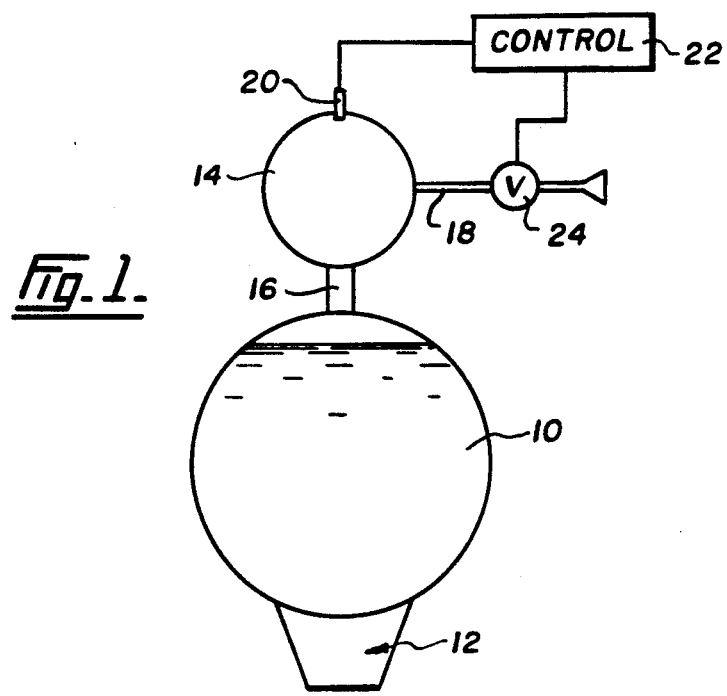
FIG. 1 is a schematic view showing a liquid tank and air pressure reservoir according to one embodiment of the present invention.

The liquid tank 10 shown in FIG. 1 may be built into the aircraft or may be removable so the aircraft can be used for other purposes. A door mechanism 12 is shown below the tank and the door mechanism has doors of sufficient size to ensure that the liquid in the tank 10 is discharged in a short time interval so that the desired coverage of water on the ground is obtained. In the system shown, an air pressure reservoir 14 is provided with a duct connection 16 to the tank 10. An air pressure supply feeds compressed air through line 18. In one embodiment, compressed air is bled from a compressed air source, such as the compressor of a jet engine. An air pressure gauge 20 is shown in the air pressure reservoir and a control 22 operates a control valve 24 controlling the supply of compressed air to the air pressure reservoir 14.

The air pressure in the system is dependent upon the specific requirements for spread of liquid on the ground. Acceleration due to gravity and acceleration due to pressurization are taken into account together with the size of the aperture in the tank for the door and the capacity of the tank.

When the door mechanism opens, there is an initial high pressure in the air pressure reservoir and the liquid tank 10 so that the water accelerates through the discharge due to gravity and due to the build up of pressure in the system. By having a large air pressure reservoir 14, the air pressure is controlled on the liquid in the tank 10 for nearly all the discharge, with additional compressed air being fed in to the tank 10 through the air pressure supply line 18 to maintain control of the fluid flow rate as the liquid level drops.

Figure 3:
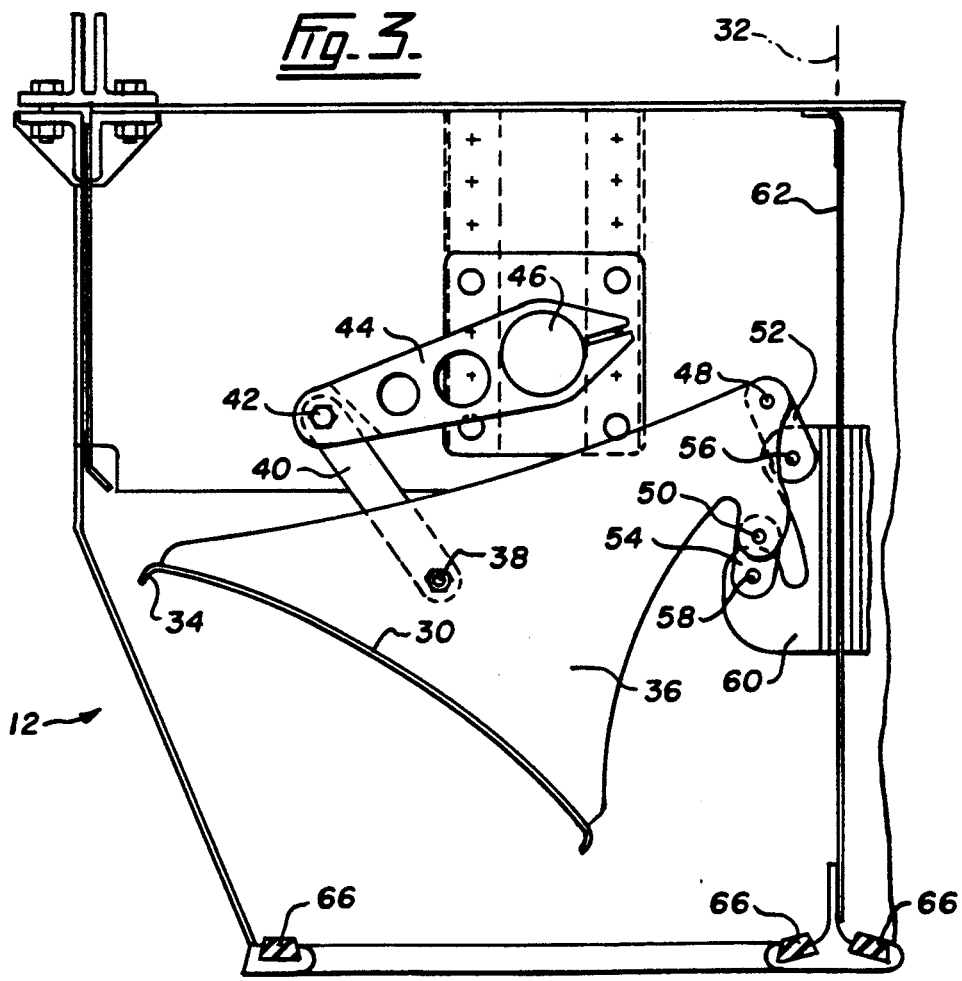
FIG. 3 is an elevational view showing one-half of the door mechanism of FIG. 2 with the door in the open position.

Another feature of this control is a variable aperture in the door mechanism which is disclosed in FIGS. 2 and 3. The discharge flow rate is proportional to the head velocity which is a function of the initial head velocity, acceleration due to gravity, artificially induced acceleration, the exit geometry discharge coefficient and the head height.

The door mechanism shown in FIGS. 2 and 3 has a tank 10 positioned above the door mechanism as illustrated in FIG. 1. Two doors 30 side by side are shown extending lengthwise along a longitudinal axis 32 of the aircraft. The doors 30 are positioned on each side of the longitudinal axis 32. In the case of a helicopter the tank may be mounted outside the aircraft rather than inside. Furthermore, in some float type aircraft the tanks may be positioned between the floats rather than in the aircraft.

Two doors 30 are illustrated, one on each side of the longitudinal axis 32 of the aircraft. As can be seen, the door 30 has lips 34 which extend along both sides and across both ends. The door 30 is supported by one or more frame members 36. For long doors, four or more frame members 36 may be included. Each frame member 36 has a connection pin 38 approximately in the centre of the door positioned above the door 30 which in turn is joined to a link 40 with a further pin connection 42 to a rotary arm 44. The rotary arm 44 rotates about a shaft 46 supported in bearings (not shown). The shaft 46 extends for the full length of the tank and out through a seal (not shown) in the end wall of the tank where it is connected to a power drive.

The top of the frame member 36 for the door 30 has a top pivot pin 48 and a bottom pivot pin 50 which in turn are connected to a top link 52 and a bottom link 54 joined to a top fixed pin 56 and a bottom fixed pin 58. The top and bottom fixed pins 56, 58 are attached to a bracket 60 fixed onto a central diaphragm 62. The linkage mechanism is provided so that the door 30 has two movements, a first movement when the door initially commences opening by moving perpendicular to the door seal plane, then when the door 30 has moved a short distance to clear the seal, it commences to swing to a fully open position which is illustrated in FIG. 3.

The lips 34 are compressed into a soft rubber seal 66 which extends along both sides and both ends of the door 30. The seal 66 is supported by the door frame 68 leaving an aperture at the bottom of the tank, and is identical on both sides of the centreline 32.

When the door 30 is in the closed position as shown in FIG. 2, the rotary arm 44 rotates so that the pin 42 is over a line between the shaft and connecting pin 38 and thus provides a mechanical advantage door locking arrangement. Thus, in this position the door cannot open as the rotary arm 44 is locked in that position and cannot rotate further. Upward force on the door only locks the rotary arm even further and does not permit the door to open. When the door is in the closed position the rotary arm 44 pushes downward so that the lip 34 of the door 30 is pushed into the seal 66 to ensure a proper seal. When the door is to be opened, the rotary arm 44 commences to rotate away from the locked position, as the door starts lifting, the first movement is perpendicular to the plane of the seal and this is controlled by the arrangement of the two links 52 and 54 attached to the bracket 60. In the embodiment shown, the first movement is substantially vertically upwards, as the plane of the seal is substantially horizontal. When the links have moved so that the top pivot pins 56 and 48 are substantially in line and the bottom pivot pins 50 and 58 are substantially in line, the first movement is complete, the rotary arm 44 continues to rotate causing the door to swing to the side as shown in FIG. 3. The door 30 can be stopped in any position up to that which is fully open as shown in FIG. 3. Liquid is then able to flow in passages on both the lefthand and the righthand side of the door, the door 30 is curved on the top surface for a more streamlined flow of liquid. When the door is half closed the flow of liquid is greatly reduced and thus the area of the passages are arranged to suit the desired discharge flow from the tank.

Two streams from each door flow outwards to meet and are directed substantially towards the longitudinal axis 32 of the aircraft below the aircraft. The two streams from both doors meet and form a single stream. In this way a single discharge stream occurs from beneath the aircraft which results in a better ground coverage.

When the door is closed, the shaft 46 is rotated so that the rotary arm 44 pushes down on link 40 which in turn pushes the door 30 closed. If the liquid in the tank has emptied at this point, then the door is closed entirely by the force from the rotating shaft 46 together with gravity. However, if only some of the liquid in the tank has been discharged, the liquid in the tank pushes against the back of the door 30 and assists in closing the door thereby reducing the power needed to close the door. This allows the door to be closed easily when only a portion of liquid in the tank has been discharged. The door movement for closing is opposite to opening, the first movement is swinging the door to position it directly over the door seal 66 and then the second movement utilizes the two links 52,54 to move the door perpendicular towards the plane of the door seal 66 to push the lips 34 into the seal 66.

By combining air pressure as disclosed in FIG. 1 with the tank 10 together with being able to open the doors a predetermined amount and then shut the doors when only a portion of the tank has discharged, one is able to control the flow rate of liquid discharging from the tank. Furthermore, by utilizing the two side-by-side doors as shown in FIG. 2, the four discharge streams, two coming from each side of each door, combine into a single stream to provide a more concentrated discharge and thus better ground coverage. The air pressure provides better control of discharging liquid than a normal vented tank or reservoir. Various ground pattern arrangements may be obtained, for instance, one may start with a low discharge flow by opening the door a small amount and then increasing the flow by opening the door further, continuing to supply air into the tank to keep the pressure up while the liquid is discharging. Thus, pressure and flow rate are controlled together.

While two doors are shown in FIG. 2, it will be appreciated that in different aircraft and different tank arrangements, several tanks may be provided in one aircraft each having two doors and generally positioned about the longitudinal axis of the aircraft. By utilizing an initial perpendicular movement from the plane of the door seal 66, the lips lift straight up and leave the seal instantly. This movement avoids doors scraping across the seal which causes wear. By utilizing the mechanical advantage locking mechanism, a positive pressure is maintained on the door to keep it sealed.

Whereas in the embodiments shown, the first movement of the door 30 is perpendicular to the plane of the door seal 66 followed by a swinging movement, in other embodiments with different tank configurations the door may be provided having only a perpendicular movement all the way. The tank configuration provides spaces on both sides of the door so two streams of liquid can flow one on each side of the door.

Various changes may be made to the embodiments shown herein without departing from the scope of the present invention which is limited only by the following claims.

The embodiments of the present invention in which an exclusive property or privilege is claimed are defined as follows:

1. A tank system for an aerial liquid delivery for discharging a high volume of liquid in a short time interval comprising:
    a liquid tank for containing a liquid and having a liquid aperture for discharging a high volume of the liquid, the liquid aperture opening to ambient;
    an inward opening door for the liquid aperture having means for sealing the liquid aperture;
    means for moving the door, the door moving means being configured to remotely open the door a predetermined amount;
    an air pressure reservoir separate from the liquid tank and being connected to the liquid tank; and
    means for pressurizing the air pressure reservoir and the liquid tank.

2. The tank system according to claim 1, wherein:
    the door has a curved upper surface thereby providing a streamlined flow of the liquid from the liquid tank.

3. The tank system according to claim 1, further comprising:
    means for providing a clear space below the door;
    the door being configured to provide at least two streams when the liquid is expelled from the liquid tank;
    the clear space providing means being sized large enough to permit said at least two streams to merge into a unified stream.

4. The tank system according to claim 1, wherein:
    the door moving means is configured to move the door between an open position and a closed position, the predetermined amount being any amount between the open position and the closed position so that the door acts as an adjustable valve for the liquid discharging from the liquid tank.

5. The tank system of claim 1 wherein:
    the pressurizing means being variable so that the pressure in the tank can be increased or decreased.

6. A tank system for an aerial liquid delivery comprising:
    a liquid tank having an aperture for discharging liquid;
    a door for the aperture having sealing means and door operating mechanism to remotely open the door a predetermined amount;
    air pressure reservoir separate from the liquid tank having connection to the liquid tank, and
    means to pressurize the air pressure reservoir and liquid tank;
    wherein at least two doors are located side-by-side extending lengthwise along a longitudinal axis of the aircraft, each door providing two liquid discharge streams from spaces on both sides of the door, the two streams from one door meeting with the two streams from the other door to form a single stream beneath the aircraft.

7. A tank system for an aerial liquid delivery system, having an improved opening door arrangement, comprising:
    a liquid tank for containing a liquid and having an exterior fixed frame extending around a liquid aperture of sufficient size to discharge a high volume of liquid in a short time interval, the liquid aperture opening to ambient;
    an inward opening door in the aperture having a lip extending around the perimeter of the door;
    a door seal of resilient material positioned in the exterior fixed frame and extending around the liquid aperture, the door seal being configured for engaging the lip of the door without having a bevelled seat engagement;
    opening mechanism for the door having first movement to move the door directly away from sealed position to instantly disengage the lip of the door from the door seal, and having a second movement to raise the door further away from the door seal to provide a passage on each side of the door for two liquid discharge streams, one on each side of the door, discharging from the liquid aperture.

8. The tank system for an aerial liquid delivery system according to claim 7 wherein the area of the passages on each side of the door is a function of tank capacity to achieve desired liquid discharge rates.

9. The tank system for an aerial liquid delivery system according to claim 7 wherein the inward opening door is positioned in different open positions to assist in minimizing turbulent flow for the liquid discharge streams.

10. The tank system for an aerial liquid delivery system according to claim 7 wherein the opening mechanism for the door has a mechanical advantage door locking arrangement to lock the door in the sealed position.

11. The tank system for an aerial liquid delivery system according to claim 7 wherein closing the door is assisted by liquid inside the liquid tank.

12. The tank system according to claim 7, wherein:
- the liquid tank has a longitudinal axis; and
- the door seal includes an upper surface which is substantially perpendicular to the longitudinal axis; and
- the door engages the upper surface of the door seal.

13. A tank system for an aerial liquid delivery system, having an improved opening door arrangement, comprising:
- a liquid tank having an exterior fixed frame extending around an aperture;
- an inward opening door in the aperture having a lip extending around the perimeter of the door;
- a door seal of resilient material in the exterior fixed frame extending around the aperture for engagement by the lip of the door;
- opening mechanism for the door having first movement to move the door directly away from sealed position to instantly disengage the lip of the door from the door seal, and having a second movement to raise the door further away from the door seal to provide a passage on each side of the door for two liquid discharge streams, one on each side of the door, discharging from the aperture;
- wherein at least two doors are provided extending lengthwise along a longitudinal axis of the aircraft, each door providing two liquid discharge streams from spaces on both sides of the door, the two streams from one door meeting with the two streams from the other door to form a single stream beneath the aircraft.

14. A method of liquid delivery from an aircraft for discharging a high volume of liquid in a short time interval, comprising the steps of:
- securing a liquid tank to an aircraft, the liquid tank having an inwardly opening door covering a liquid aperture;
- opening the door inwardly so that a liquid discharge is expelled from the liquid tank, through the liquid aperture and onto the fire;
- providing air pressure to the liquid tank with means for providing pressure, the pressure providing means being variable before and during the liquid discharge from the tank to control the flow of liquid discharging through the liquid aperture, the pressure providing means also being variable so that the pressure in the tank can be both increased or decreased.

15. The method of liquid delivery from an aircraft according to claim 14 wherein at least two doors are located side-by-side lenghthwise along a longitudinal axis of the aircraft, each door providing two liquid discharge streams from spaces on both sides of the door, the streams from both doors meeting to form a single stream beneath the aircraft.

16. The method of liquid delivery from an aircraft according to claim 14 wherein the door is opened in increments to control discharge flow rate of liquid from the tank.

17. The method of liquid delivery from an aircraft according to claim 14 wherein the air pressure is built up using a compressed air source.

18. The method of liquid delivery from an aircraft according to claim 14 wherein discharge flow rate of liquid is controlled by varying pressure in the liquid tank and varying opening position of the door to provide a predetermined drop pattern.

19. A method of liquid delivery from an aircraft comprising the steps of:
- providing air pressure to a liquid tank, the tank having a door in an aperture for discharging liquid, the pressure provided to the tank before and during liquid discharge from the tank to control the flow of liquid discharging through the aperture, the air pressure being built up using a compressed air source, the compressed air source being an aircraft engine supplying engine bleed air.

* * * * *